(No Model.)  6 Sheets—Sheet 1.

J. W. MEAKER.
FARE REGISTER.

No. 583,496.  Patented June 1, 1897.

(No Model.) 6 Sheets—Sheet 2.

J. W. MEAKER.
FARE REGISTER.

No. 583,496. Patented June 1, 1897.

(No Model.)  6 Sheets—Sheet 3.

J. W. MEAKER.
FARE REGISTER.

No. 583,496.  Patented June 1, 1897.

(No Model.) 6 Sheets—Sheet 5.

J. W. MEAKER.
FARE REGISTER.

No. 583,496. Patented June 1, 1897.

United States Patent Office.

JOHN W. MEAKER, OF CHICAGO, ILLINOIS, ASSIGNOR TO THE MEAKER MANUFACTURING COMPANY, OF SAME PLACE.

FARE-REGISTER.

SPECIFICATION forming part of Letters Patent No. 583,496, dated June 1, 1897.

Application filed August 6, 1894. Serial No. 519,610. (No model.)

*To all whom it may concern:*

Be it known that I, JOHN W. MEAKER, a citizen of the United States, residing at Chicago, in the county of Cook and State of Illinois, have invented certain new and useful Improvements in Fare-Registers, of which the following is a specification, reference being had to the accompanying drawings, in which—

My invention relates to fare-registers, and has for its object to provide improvements in the construction and operation of that class of registers known as "stationary" registers.

It consists in improved mechanism for sounding the bell upon each complete actuation of the register mechanism, in a lock whereby the resetting mechanism and the register-operating mechanism cannot be simultaneously operated, in an improved construction by means of which the capacity of the trip-register is greatly increased without increasing the size of the register or multiplying its parts, in an improved lock for the register-operating mechanism, in an improved device for preventing fraudulent actuation of the register, and in certain other improvements, all of which will be more particularly hereinafter set forth.

That which I regard as new will be set forth in the claims.

I have described and illustrated my improvements as applied to stationary registers of the class shown in Letters Patent No. 454,370, granted to me June 16, 1891, such registers in general consisting of a suitable case in which are inclosed two registering mechanisms, one of which is designed as a trip-register and the other as a total register, the trip-register being provided with suitable resetting mechanism whereby at the end of each trip the register may be reset at "0." The registering devices in such machines consist of a series of chains, each composed of ten links bearing figures from "0" to "9," which chains are actuated by pawls carried by a pull-bar, the pull-bar being operated by a strap or cord in the car.

Figure 6:
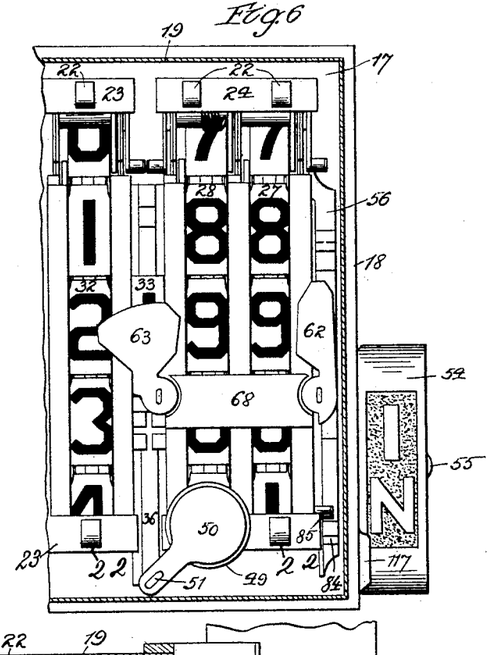
Fig. 6 is a partial front view of the register, the case being in section.
Figure 7:
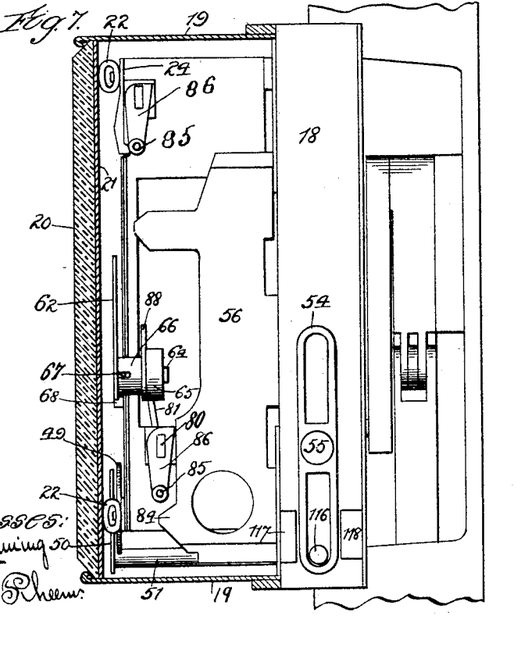
Fig. 7 is an end view, the case being in section.

Referring to the drawings, the case of the register consists of a back plate 18, to which are secured side pieces 19, having a glass front 20. The glass front 20 rests upon a plate 21, which in turn rests upon rubber bumpers 22, mounted upon the corners of the total and trip register frames 23 24, as shown in Figs. 6 and 7. In order to prevent the front 20 from becoming displaced, the front edges of the side pieces 19 are doubled over, as shown in Fig. 7. The plate 21 is provided with sight-openings 25 for the trip and total registers. It is also provided with an opening 26 to expose the "ring" signal, as will be hereinafter descirbed.

Figure 2:
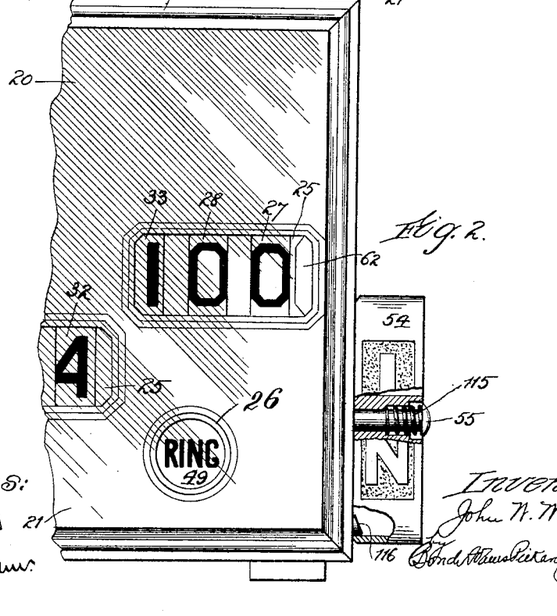
Fig. 2 is a partial front view showing the arrangement of the trip-register for registering "100" or upward.
Figures 11, 13, 14, 15, 16:
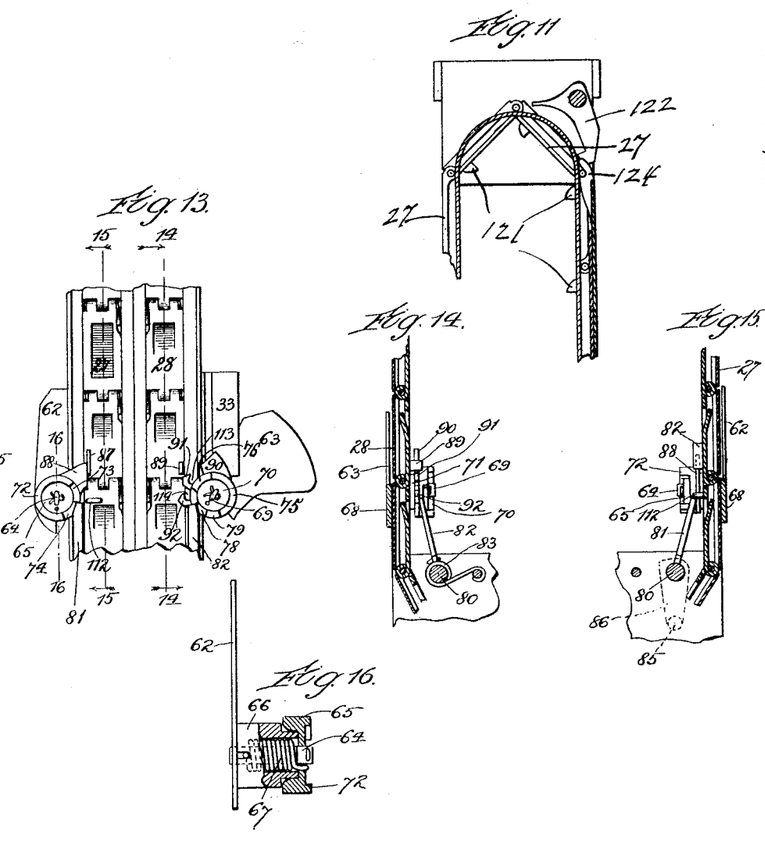
Fig. 11 is a detail, being a vertical sectional view of a portion of the register mechanism, showing the pawls for preventing jumping and reverse movement of the chains.
Fig. 13 is a similar view showing the position of the cancelers when "100" or more is indicated.
Fig. 14 is a vertical section on line 14 14 of Fig. 13.
Fig. 15 is a vertical section on line 15 15 of Fig. 13.
Fig. 16 is an enlarged detail, being a partial sectional view on line 16 16 of Fig. 13.
Figure 19:
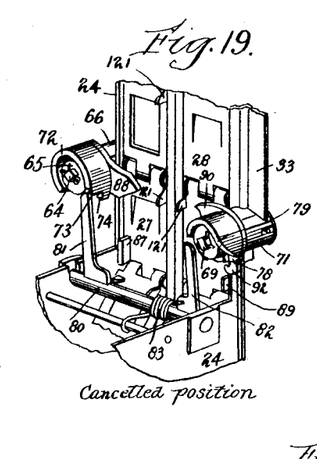
Figs. 19, 20, 21, 22, and 23 are perspective views showing the canceler-locking mechanism in various positions.

The total and trip register frames 23 24 are preferably of the construction described in my former patent hereinabove referred to, the trip-register having a units-chain 27 and a tens-chain 28. The total register is provided with four chains 29 30 31 32, registering thousands, hundreds, tens, and units, respectively. The trip-register frame 24 also carries the numeral "1" arranged opposite the sight-opening 25 at the proper point to indicate hundreds, as best shown in Fig. 2, said numeral being marked upon a plate 33, secured to the trip-register frame, as shown in Figs. 6, 13, and 19. When the indication is less than one hundred, said numeral is canceled in a manner which will be hereinafter described, it being exposed at all points between "100" and "199." By this construction the capacity of the register is doubled by merely exposing or canceling a single figure without the addition of an extra register-chain.

Figure 3:
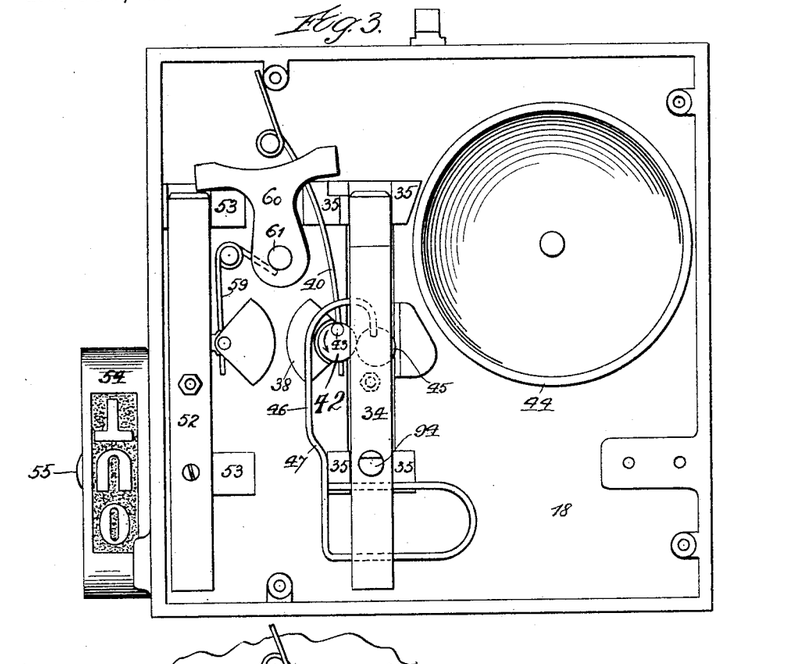
Fig. 3 is a rear view of the register.
Figures 4, 5:
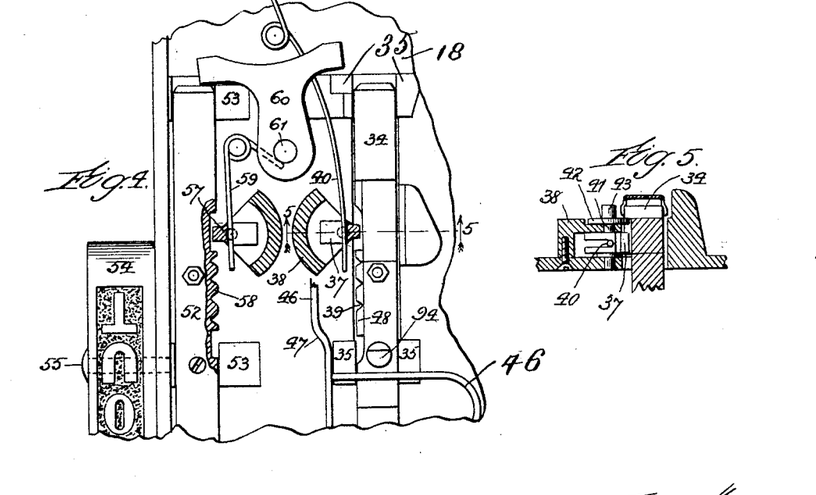
Fig. 4 is a partial rear view, parts being in section.
Fig. 5 is a section on line 5 5 of Fig. 4.

34 indicates the operating pull-bar of the register, which is arranged on the rear side of the back plate 18, being adapted to be reciprocated between suitable guides 35, as shown in Figs. 3 and 4. The pull-bar 34 is connected to a bar 36 upon the front side of the back plate 18, which bar is adapted to reciprocate between the total and trip register frames and carries actuating-pawls by means of which the register-chains are actuated. As the construction of such actuating-pawls is well known, I have not described them herein, and it is sufficient to say that they are adapted to actuate the register-chains on the upward or positive movement of the pull-bar.

A complete stroke of the pull-bar 34 at each actuation of the register is compelled by means of a dog 37, Fig. 4, which is pivoted in a suitable support 38, secured to the back plate 18, which dog is adapted to engage a plate 48, formed with or secured to and projecting from one side of the pull-bar 34, in which plate is a series of notches 39, as shown in Fig. 4. A spring 40 serves to hold the dog 37 normally in a position at right angles to the pull-bar 34. The arrangement is such that when the pull-bar 34 is moved in one direction or the other the dog 37 will be tilted sufficiently to permit the pull-bar to pass it, but return movement before the completion of the full stroke is prevented by reason of the fact that the dog 37 will enter the notches 39. At the completion of the full stroke of the pull-bar the plate 48 passes beyond the dog 37, so that said dog may assume its normal position, thereby permitting the movement of the pull-bar to be reversed, the dog being tilted in the opposite direction during such return movement. The construction and operation of the dog 37 have been fully described in Letters Patent No. 478,167, granted to me July 5, 1892.

Secured rigidly to the pivot 41 of the dog 37 is a plate or disk 42, from which projects a pin 43, arranged eccentrically, as shown in Fig. 3, for a purpose to be hereinafter stated.

44, Fig. 3, indicates a bell secured to the back plate 18.

45 indicates a bell-hammer carried by a spring 46, secured to the pull-bar 34, as shown in Fig. 3. The spring 46, as shown in Fig. 3, is bent, having an inclined portion 47, so that the lower portion of the spring is nearer the pull-bar 34 than the upper portion of said spring. When the pull-bar 34 moves upward, as it does when the cord is pulled and the register is operated, the spring 46 will move upward with it. At the same time the upward movement of the pull-bar will cause the adjacent portion of the dog 37 to move in the same direction, thereby rotating the disk 42 in the direction indicated by the arrow in Fig. 3 and moving the pin 43 toward the spring 46. The adjustment is such that when the pull-bar 34 approaches the end of its upper stroke the pin 43 will strike the inclined portion 47 of the spring 46, thereby pressing said spring away from the pull-bar, placing it under tension. When the pull-bar reaches the upper end of its stroke, the dog 37 will be suddenly released and will return to its normal position, thereby releasing the spring 46, the tension of which will be sufficient to cause the hammer 45 to strike the bell. By this construction it will be impossible to sound the bell at any time except when the pull-bar reaches the limit of its upper movement and a complete actuation of the register-chains has been effected.

Inasmuch as the bell is not rung until the dog 37 passes beyond the notched plate 48, it is possible for the operator to raise the pull-bar sufficiently to effect the next higher indication without ringing the bell, but it will be necessary in order to do so to leave the pull-bar locked in its upper position. In this way the operator, upon receiving one fare, could operate the register to effect the next higher indication, and then upon the receipt of another fare he could, by completing the stroke of the pull-bar, ring the bell without effecting an additional registration. In this way fraud might be perpetrated. To overcome this objection, I provide a signal 49, which, as here shown, (see Fig. 2,) is secured upon the lower portion of the trip-register frame 24 and is opposite the sight-opening 26. The signal 49 preferably has marked upon it the word "Ring."

Figure 1:
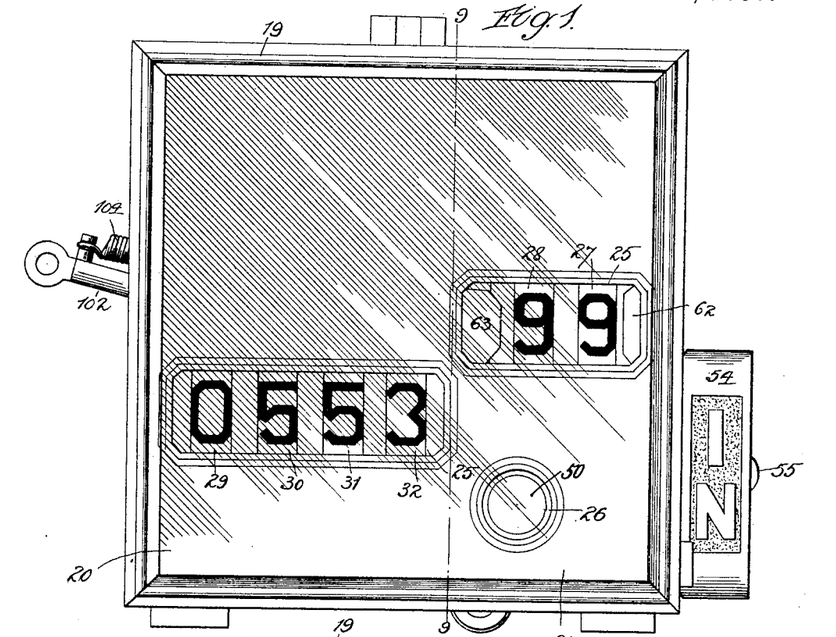
Figure 1 is a front view.

50, Fig. 6, indicates a plate or shutter which is mounted upon a rod 51, secured to and projecting from the lower end of the sliding bar 36. The plate 50 is adapted, when the sliding bar 36 is in its lowermost position, to project over and hide the signal 49, as shown in Figs. 1 and 6. When, however, the sliding bar 36 is moved upward, as in operating the register, a portion or all of the signal 49 is exposed, so that should the sliding bar 36 be locked in its uppermost position the signal 49 will be fully exposed, warning the passengers in the car that a complete actuation of the register has not been made.

For the purpose of resetting the trip-register a sliding bar 52, Figs. 3 and 4, is provided, which slides upon the back plate 18 between suitable guide-lugs 53 and is operated by means of a handpiece 54, arranged at one side of the back plate 18 and connected to the sliding bar 52 by a screw or pin 55, as shown in Figs. 2, 4, and 6, the pin 55 passing through a slot in the case. The sliding bar 52 is connected by a screw or pin to a sliding plate 56, Fig. 7, mounted upon the front side of the back plate 18 at one side of the trip-register frame, as shown in Figs. 6 and 17.

Figure 17:
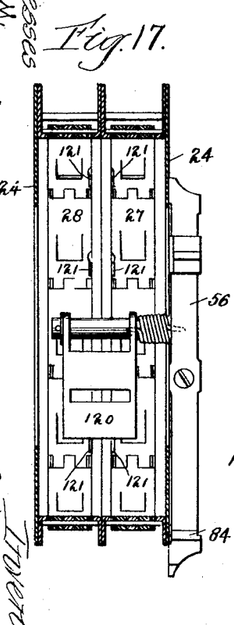
Fig. 17 is a vertical section of the trip-register frame on line 17 17 of Fig. 18.
Figure 18:
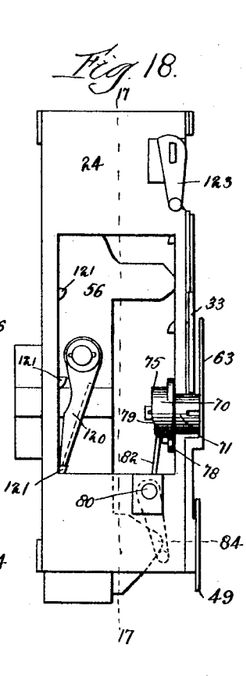
Fig. 18 is a side elevation of the trip-register frame.

As illustrated in Figs. 17 and 18, the sliding plate 56 carries a resetting-pawl 120, which engages lugs 121, carried by the trip-register chains 27 28, and acts to reset said trip-register chains in the manner described in my patents hereinbefore referred to.

122 indicates pawls for preventing jumping of the register-chains. Said pawls are connected to crank-arms 123, (shown in Figs. 12 and 18,) which are operated by the plate 56, as described in my said former patents. Reverse movement of the chains is prevented by pawls 124, as also described in said patents.

For compelling a full stroke of the resetting mechanism a dog 57 is provided which is similar to the dog 37 and is adapted to engage a notched plate 58, similar to the notched plate 48. A spring 59 serves to hold the dog 57 normally at right angles to the bar 52.

Simultaneous operation of the pull-bar 34 and the resetting sliding bar 52 is prevented by means of a rocking T-shaped plate 60, which is pivoted upon a pivot 61 to the back plate 18 between the two slide-bars 34 and 52, as shown in Figs. 3 and 4. The arms of the plate 60 are of such length that when it is in a vertical position they will project over the upper ends of both slide-bars, thereby locking both. When, however, one only of said bars is operated, the plate 60 will be tilted away from the bar operated, the upper ends of the bars being beveled for that purpose, and when the plate 60 is in such position the bar operated will be free to move, but the other sliding bar will remain locked, as shown in Fig. 4. By this construction it is rendered absolutely impossible to operate both sliding bars 34 52 simultaneously.

62, Figs. 1, 2, 6, 12, and 13, indicates a canceler for the units-chain 27 of the trip-register, and 63 indicates a canceler for the tens-chain of the trip-register and also for the hundreds figure of said register. The canceler 62 is fixedly mounted on one end of a shaft 64, arranged at right angles thereto, which shaft carries at its opposite end a cap 65, as shown in Figs. 16 and 19. The shaft 64 is mounted in a sleeve 66, fixedly secured at one side of the trip-register frame 24, as shown in Fig. 7. The sleeve 66 serves also as a journal for the cap 65. A spring 67 is mounted on the shaft 64, one end thereof being connected to the cap 65, the other end thereof being connected to the sleeve 66. The spring 67 acts to move the canceler 62 in a direction contrary to that in which the hands of a clock move, so that the normal position of the canceler 62 is such as to hide the numeral on the units-chain 27 of the trip-register. The canceler 63 is mounted upon a shaft 69, similar to the shaft 64, which shaft 69 also carries a cap 70, Figs. 12 and 13, in some respects similar to the cap 65. The shaft 69 is mounted in a sleeve 71, (see Figs. 14 and 19,) which is similar to the sleeve 66 and is mounted at the side of the register-frame 24 opposite that to which said sleeve 66 is secured. A plate 68, which extends across and is secured to the trip-register frame, as shown in Fig. 6, serves as a stop to limit the motion of both cancelers 62 63 and as a support for the sleeves 66 71, which are preferably made integral therewith. A spring similar to the spring 67 serves to throw the canceler 63 across the face of the tens-chain 28 of the trip-register when the canceler is free to move in such direction.

The cap 65 is provided with a circumferential flange 72, a portion of which is cut away, forming steps 73 74, as shown in Figs. 12, 13, 19, 20, and 22. The cap 70 is also provided with a circumferential flange 75, a portion of which is cut away, forming steps 76 77 78, as shown in Figs. 12, 13, 19, 21, and 23, the flanges of the two caps forming upper steps. The flange 75 of the cap 70 is also provided with a beveled or inclined surface 79, adjacent to the lowermost step 78, which inclined surface extends from the lowermost level to the face of the flange 75, as best shown in Figs. 19 and 23.

80, Figs. 9, 12, 14, and 15, indicates a rock-shaft which is mounted in the trip-register frame slightly below the shafts 64 69, which shaft 80 carries at its end pawls 81 82, adapted to rest upon the flanges 72 75, respectively, being held normally in engagement with said flanges by a spring 83, mounted upon the shaft 80. In the construction shown the pawls 81 82 are arranged in the same plane, the treads of the various steps in the flange 72 being on a different level from those in the flange 75, by which arrangement, when the cancelers 62 63 are in their normal position across the faces of the trip-register chains, the pawl 81, Fig. 12, will rest upon the surface of the flange 72, (which may be termed the "tread" of the upper step,) the pawl 82 being thereby held up out of contact with the tread of the step 76, as illustrated in Fig. 19. By slightly rotating the canceler 62 the pawl 81 will pass beyond the riser of the upper step and the two pawls will thereby be permitted to drop until the pawl 82 rests upon the tread of the step 76. Owing, however, to the fact that the treads of the steps 73 76 are upon different levels, the tread of the step 73 being on a lower level, the pawl 81 will be held above the tread of the step 73, but it will engage the riser of the uppermost step, thereby holding the canceler 62 against return movement. The canceler 62 may, however, be turned outward to expose the numeral on the units-chain, but as the pawl 81 cannot engage the riser of the step 74 as soon as the canceler 62 is released it will return to its former position. Should the canceler 63 now be turned to expose the numeral on the tens-chain of the trip-register, the pawl 82 will pass beyond the tread of the step 76 and the pawls 81 82 will be permitted to drop under the action of the spring 83 until the pawl 81 comes into contact with the tread of the step 73, the pawl 82 at such time being in engagement with the riser of the step 76, but being slightly above the tread of the step 77, owing to the fact that the tread of such step is below the level of the tread of the step 73. (See Figs. 20 and 21.) The canceler 63 will therefore be locked in such position as to expose the numerals on the tens-chain. By now moving the canceler 62 to expose the numerals on the units-chain the tread of the step 73 will be moved from under the pawl 81, thereby permitting the pawls 81 82 to move under the action of the spring 83 until the pawl 82 comes into contact with the tread of the step 77, the pawl 81 being slightly above the tread of the step 74, but being in contact with the riser of the step 73, thereby locking the canceler 62 against return movement. Should the canceler 63 be moved to expose the stationary hundreds figure, the tread 77 will pass from under the pawl 82, permitting the pawls 81 82 to drop under the action of the spring 83 until the pawl 81 rests upon the tread of the step 74, the pawl 82 resting upon the tread of the step 78. (See Figs. 22 and 23.) Should the canceler 63 be moved still farther, the pawl 82 will strike the incline 79 and be lifted thereby to the level of the surface of the flange 75, thereby rocking the shaft 80 and lifting the pawl 81 to about the same level, permitting both cancelers to move across the faces of their respective register-chains, canceling the indication.

Instead of arranging both pawls 81 82 in the same plane and arranging the treads of the steps of the two flanges 72 75 on different levels such treads may be arranged on the same level and the pawls be arranged on different levels, as it is obvious that the operation in such case would be the same.

Figure 12:
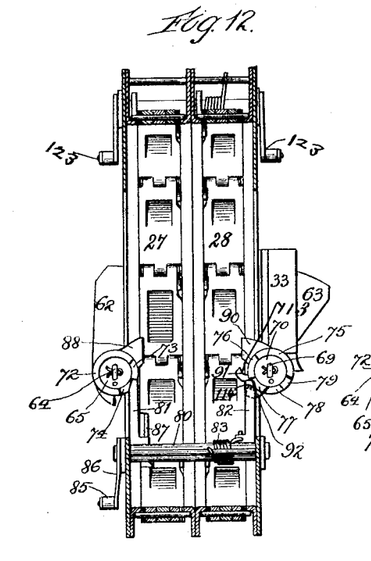
Fig. 12 is a longitudinal vertical section through the trip-register frame, showing the devices for locking the cancelers in the different positions.

In resetting the register by the resetting mechanism the units and tens chains are moved forward simultaneously, the cancelers being released upon the first actuation of the resetting mechanism by means of a lug 84 on the lower end of the sliding plate 56, which lug engages a roller 85, carried by an arm 86, secured to one end of the shaft 80, as shown in Fig. 12. When the sliding plate 56 is moved in one direction or the other, the lug 84 strikes the roller 85, when, owing to the inclined edges of the lug, the arm 86 is thrown forward, rocking the shaft 80 sufficiently to raise the pawls 81 82 out of engagement with the flanges 72 75, thereby releasing the cancelers 62 63 and permitting them to move across the face of the register-chains. The position of the canceler-locking devices at this time is illustrated in Fig. 19.

Figures 20, 21:
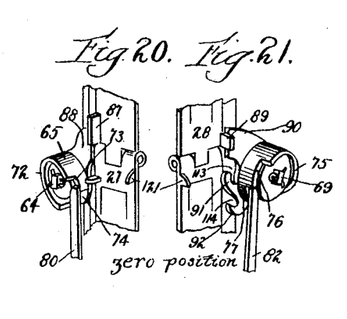
Figures 22, 23:
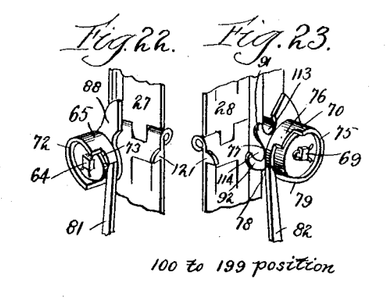

When "0" on the units-chain arrives opposite the sight-opening, the canceler 62 is moved away from in front of such figure by means of an inwardly-projecting lug 87, carried by the "0" link of said chain, which lug strikes an arm 88, carried by the cap 72 and having an inclined edge, as shown in Figs. 12 and 19. The length of the arm 88 is such that when it is struck by the lug 87 it will be moved outward, thereby rocking the shaft 64 sufficiently to move the canceler 62 from in front of the sight-opening, thereby exposing said link. The position of the lug 87 and canceler 62 at such time is illustrated in Figs. 13 and 20. The "0" link of the tens-chain is also provided with a lug 89, Fig. 13, substantially similar to the lug 82, which acts in the same way upon an arm 90, carried by the cap 70, so that when the "0" link of the tens-chain arrives opposite the sight-opening it will be exposed by reason of the fact that the canceler 63 will be moved away from in front of it by the engagement of the lug 89 with the arm 90, as shown in Fig. 21. As soon as both cancelers are moved back, as above described, by the resetting of the register-chains to "0" the pawl 82 will be permitted to act to hold the canceler 63 in such position, (see Fig. 21,) the canceler 62 being still held back only by the lug 87, as said lug is not close enough to the arm 88 to move said canceler back far enough to permit the pawl 81 to engage the riser of the step 73, as shown in Fig. 20. When, however, the units-chain is thereafter first moved by operating the register pull-bar, the arm 88 will be thrown back far enough for the pawl 81 to so act by a lug 112, carried by the units-chain below the lug 82, preferably on the next succeeding link, which lug 112 is nearer the edge of the chain and consequently acts to throw the arm 88 back farther than it is moved by the lug 82.

Should the units-chain alone be reset to "0" and an attempt be then made to actuate the register by means of the pull-bar, the actuation of the units-chain would move the lug 87 out of contact with the arm 88, thereby permitting the canceler 62 to move across the face of the units-chain, the pawl 81 being inoperative to lock the canceler 62 in its outer position owing to the fact that it is held out of engagement with the step 74 by the pawl 82, which rests upon the step 76 of the cap 70, as above described. At this time the tens-chain will be canceled by the canceler 63. Furthermore, fraudulent registration by resetting the tens-chain and then attempting to withdraw the units-canceler by operating the pull-bar of the register is prevented by reason of the fact that should the tens-chain alone be reset to "0" and the canceler 63 be thereby moved from in front of said chain by the engagement of the lug 89 with the arm 90 the units-canceler would cancel the units-register until "0" should be exposed at the sight-opening, when such canceler would be moved back by the lug 87. However, in view of the fact that when the units-chain is operated by the pull-bar to expose "0" at the sight-opening "1" is carried to the tens-chain, upon such actuation of the pull-bar the tens-chain would be moved to expose "1" at the sight-opening, thereby moving the lug 89 out of engagement with the arm 90 and permitting the canceler 63 to cancel the indication of the tens-chain. The pawl 82 would not act to lock the canceler 63 back, since said pawl would be held out of operative position by the pawl 81, which would rest upon the flange 72 until the lug 89 moves sufficiently to release the arm 90 and permit the canceler 63 to cancel the reading of the tens-chain. At the next actuation of the pull-bar the lug 87 would be moved out of engagement with the arm 88 and the canceler 62 be thereby permitted to cancel the indication of the units-chain.

Owing to the fact that when the resetting-bar is operated both cancelers are released and the pawl 81 rests upon the face of the flange 72 the pawl 82 cannot act to lock back the canceler 63 until the units-chain has been moved to bring its "0" link opposite the sight-opening, when the lug 87 will move the canceler 62 back sufficiently to permit the pawl 81 to pass the riser of the uppermost step of the cap 65; and inasmuch as the pawl 81 cannot lock back the canceler 62 until the canceler 63 is locked back by its pawl 82, as above described, the permanent locking back of both cancelers is dependent either upon their being alternately moved back (which can be done fraudulently only by hand and when the case is removed) or by holding both cancelers back at the same time, which is accomplished by the lugs 87 89, when the units and tens chains both show "0" at the sight-opening. In order, therefore, to properly reset the register, the resetting-bar must be operated until the "0" links of both chains appear at the sight-openings, when, as above stated, both cancelers will be withdrawn and locked in such position.

When "99" is indicated by the register and an additional registration is made, the lug 89 will engage an arm 91, projecting from the cap 70, which arm is moved into position to be engaged by said lug when the canceler 63 is moved to expose the tens-chain, as shown in Figs. 12 and 21. The forward motion of the tens-chain will therefore act to rock the shaft 69, thereby moving the canceler 63 over far enough to expose the numeral "1" on the plate 33 at the left-hand side of the tens-chain, as shown in Fig. 2, and the canceler will be locked in such position by the pawl 82, which will move into contact with the riser of the step 78 in the cap 70. When the register indicates "199" and the pull-bar is operated, the lug 89 will engage a second arm 92, also carried by the cap 70, thereby rotating the cap 70 sufficiently to cause the pawl 82 to strike the incline 79, thereby causing said pawl to be moved upward, rocking the shaft 80 and throwing the pawl 81 out of engagement with the cap 65 and releasing both the cancelers, thereby canceling the indication.

In order to prevent "jumping"—that is, throwing the canceler 63 beyond the proper point—the arms 91 92 are provided with recesses 113 114, so that said arms 91 92 are somewhat hook-shaped, as shown in Fig. 13. The arrangement is such that when the canceler 63 is moved back by the engagement of the lug 89 with the arm 90 should said arm 90 be struck with sufficient force to throw the canceler 63 outward beyond the proper point the arm 91 would strike the lug 89, said lug entering the recess in said arm, thereby firmly locking the canceler 63 against further outward movement. In the same way when said canceler is moved outward by engagement of the lug 89 with the arm 91 excessive outward movement is prevented by the arm 92, which will engage the lug 89 and lock the canceler, as above described.

In order to prevent the accidental operation of the resetting mechanism by the jolting of the car over rough places, the handpiece 54 is movable outward upon the screw 55, being normally held in contact with the side of the register-case by means of a spring 115, as best shown in Fig. 2. A lug 116, which is secured to the lower end of the case opposite the normal position of the handpiece 54, is adapted to lock said handpiece in its lowermost position, as shown in Fig. 7, the handpiece being automatically moved over said lug upon its downward movement, inasmuch as the upper portion of said lug is beveled, as shown in Fig. 2. In order to operate the handpiece it must be drawn away from the side of the case sufficiently to release it from the lug 116, after which it is free to move. In resetting the register it is necessary to reciprocate the handpiece a number of times, and in order to prevent it from locking at each reciprocation it may be turned at an angle to the case. Guides 117 118 at each side of the lug 116 serve to hold the handpiece 54 in a vertical position except when it is moved upward a considerable distance, as best shown in Fig. 7.

Figure 8:
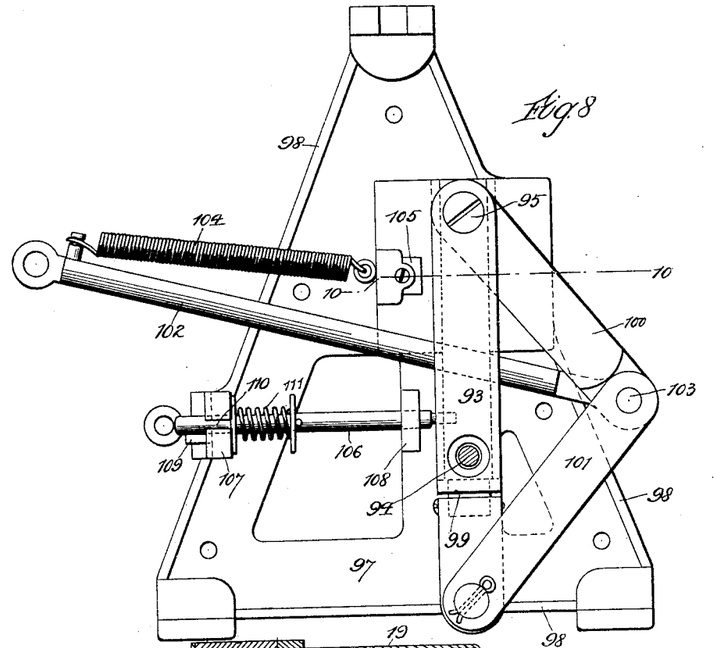
Fig. 8 is an elevation of part of the register-operating mechanism, sectioned through the pin 94 on line 8 8 of Fig. 9.
Figures 9, 10:
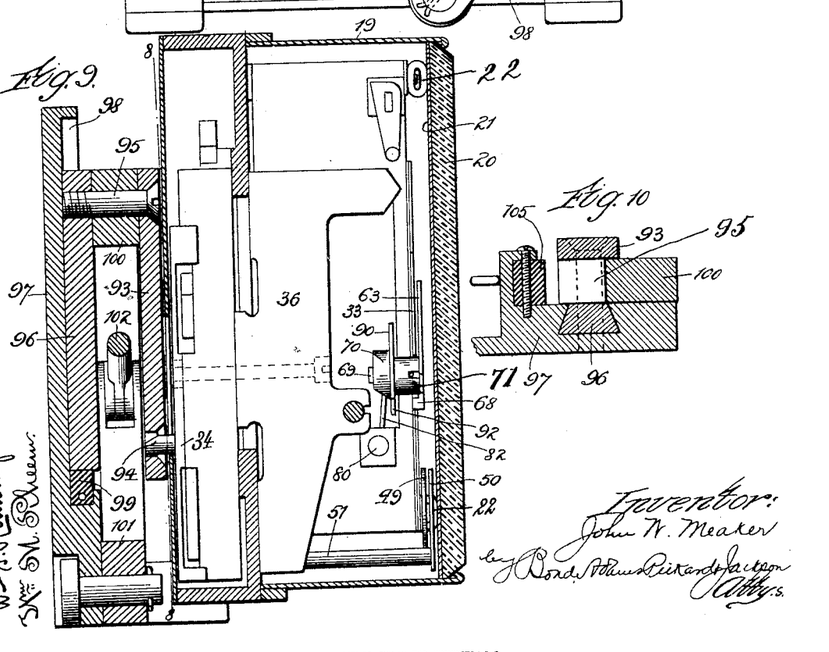
Fig. 9 is a section on line 9 9 of Fig. 1.
Fig. 10 is a cross-section on line 10 10 of Fig. 8.

The operating pull-bar of the register is actuated by means of a link 93, the lower end of which is connected to a pin 94, projecting from the pull-bar, Fig. 8. The upper end of the link is pivoted upon a bolt or screw 95, which is connected to a sliding bar 96, sliding in a groove in a supporting-plate 97, the bar 96 being dovetailed in said groove, as shown in Fig. 10. The supporting-plate 97 is preferably triangular in form and is provided with a marginal rib or flange 98, which serves to strengthen it. At the lower end of the groove, in which slides the bar 96, is a bumper 99, of rubber or other elastic material, as shown in Fig. 9. The sliding bar 96 is caused to reciprocate vertically by means of a toggle consisting of links 100 101, the link 101 being pivoted at its lower end to the supporting-plate 97 and at its upper end to the lower end of the link 100, the upper end of the link 100 being pivoted upon the bolt 95. A rod or connecting device 102 is connected at one end to the pivot 103, which unites the links 100 101, the opposite end of such rod being connected to the strap or other device in the car, by means of which the register is operated.

104 indicates a spring, one end of which is connected to the rod 102, its opposite end being connected to the plate 97, as shown in Fig. 8. The spring 104 serves to return the rod 102 after the register has been operated.

105, Fig. 8, indicates a bumper which is secured upon the plate 97 at one side of the sliding bar 96 in convenient position to act as a stop to limit the movement of the link 100, as shown in Fig. 8. By this construction jumping of the register is prevented, inasmuch as the link 93 cannot be moved vertically beyond a certain point. The register may also be operated by a short pull upon the cord in the car, which is considered an advantage under some circumstances.

For the purpose of locking the register a pin 106 is provided, fitted in suitable guides 107 108 on the supporting-plate 97, which pin carries a lug 109 at one side near its outer end, as shown in Fig. 8. The guide 107 is provided with a suitable slot 110, adapted to permit the passage of the lug 109. The inner end of the pin 106 is adapted to enter a socket in the sliding bar 96, as indicated by dotted lines in Fig. 8. By turning the pin 106 until the lug 109 comes into line with the slot 110 the pin may be moved forward into engagement with the sliding bar 96. It may be locked out of engagement with said sliding bar by drawing said pin out and partially rotating it until the lug 109 lies out of line with the slot 110, as shown in Fig. 8. A spring 111, mounted upon the pin 106, serves to move said pin inward for the purpose of locking the register.

While I have described my invention in detail, it will be understood that I do not restrict myself to the specific devices illustrated and described, except as specifically claimed, as many modifications may be made without departing from the spirit of my invention, and particularly do I wish it to be understood that the cancelers constructed and operating as herein described are claimed broadly.

That which I claim as my invention, and desire to secure by Letters Patent, is—

1. In a register, the combination with a resetting slide-bar, of a handpiece for operating the same, and a lock adaped to automatically engage said handpiece to lock said slide-bar in its normal position, substantially as described.

2. In a register, the combination with a resetting slide-bar, of a handpiece 54, a pin connecting said handpiece and said slide-bar, a spring on said pin, and a lug 116 adapted to engage said handpiece, substantially as and for the purpose specified.

3. In a register, the combination with a pull-bar, and a dog adapted to be tilted in one direction or the other by the reciprocation of said pull-bar, of a bell, a spring carried by said pull-bar, a hammer carried by said spring, and a pin carried by said dog, said pin being adapted to engage said spring upon the upstroke of the pull-bar and to release the same at the end of said stroke, substantially as described.

4. In a register, the combination with a pull-bar, a spring carried thereby, and a hammer carried by said spring, of a bell, and a device actuated by the movement of said pull-bar to move into engagement with and retract said spring, said device being arranged to release said spring upon the completion of the stroke of said pull-bar, substantially as described.

5. In a register, the combination with a pull-bar carrying notches 39, and a pivoted dog adapted to engage said notches, of a pin 43 carried by said dog, a spring 46 carried by said pull-bar, said spring having an inclined portion 47, a bell, and a striker carried by said spring, substantially as described.

6. In a register, the combination with registering devices, and a pull-bar for actuating the same positively, of a case, a sight-opening in said case, a stationary signal opposite said sight-opening, and a blind carried by said pull-bar and movable over said signal for the purpose of hiding the same when said pull-bar is in its normal position and exposing said signal whenever the register is actuated, substantially as described.

7. In a register, the combination with units and tens registering mechanism, and mechanism for actuating the same, of a stationary figure adapted to indicate hundreds, a canceler adapted to cancel said hundreds figure, means for removing said canceler to expose said hundreds figure and means for continuing the exposure of said figure after the indication passes "100," substantially as described.

8. In a register, the combination with units and tens registering mechanism, and mechanism for actuating the same, of a stationary figure adapted to indicate hundreds, a canceler adapted to cancel said hundreds figure, means for removing said canceler to expose said hundreds figure, and means for automatically canceling the entire indication when it is attempted to operate the register in excess of its capacity, substantially as described.

9. In a register, the combination with mechanism for registering units and tens, and means for operating the same, of a stationary figure adapted to indicate hundreds, a canceler adapted normally to cancel said hundreds figure, means for removing said canceler to expose said hundreds figure at the proper time, resetting mechanism adapted to be operated to reset the units and tens registering devices to zero, means for automatically canceling said hundreds figure upon the actuation of the resetting mechanism, and means for continuing the exposure of said hundreds figure after the indication passes "100," substantially as described.

10. In a register, the combination with registering mechanism, mechanism for actuating the same, and means for exposing the indication of said registering mechanism, of a stationary figure arranged at one side of said registering mechanism and adapted to be read in connection therewith, a canceler adapted to cancel said stationary figure, means for removing said canceler to expose said stationary figure, and means for continuing the exposure of said stationary figure during the succeeding operation of the register, substantially as described.

11. In a register, the combination with units and tens registering devices, means for actuating the same, and a hundreds figure, of a canceler for said units-registering device, a canceler for said hundreds and tens registering devices, said latter canceler being adapted normally to cancel said hundreds figure, mechanism for removing said latter canceler to expose said hundreds figure when necessary, resetting mechanism, means for automatically canceling the entire registration when the resetting mechanism is operated, and means for withdrawing said cancelers from the units and tens registering devices when the register has been reset to zero, substantially as described.

12. The combination with registering devices, and operating mechanism and resetting mechanism therefor, of cancelers, and devices for locking said cancelers in their different positions, said locking devices being interdependent in operation, substantially as and for the purpose specified.

13. The combination with units and tens registering devices, and operating mechanism and resetting mechanism therefor, of cancelers, and devices for locking said cancelers in their different positions, the locking device for the canceler of one register being operative to permanently lock back said canceler only when the other registering device has been reset to zero, substantially as described.

14. The combination with registering devices, and mechanism for actuating the same of mechanism for automatically canceling the entire indication of the register when it is attempted to operate the register in excess of its capacity.

15. In a register, the combination with a trip-register having devices for registering units and tens, of cancelers for said registering devices, resetting mechanism, and devices for locking said cancelers out of view, said locking devices being operative for such purpose only when the registering devices are so reset that zero is exposed at the sight-opening by both units and tens registering devices, substantially as described.

16. The combination with units and tens registering devices, and operating mechanism and resetting mechanism therefor, of pivoted cancelers, each of said cancelers having a series of steps, and pawls for engaging said steps to lock said cancelers in their different positions, the action of said pawls being interdependent, substantially as and for the purpose specified.

17. In a register, the combination with units and tens register chains, and operating mechanism and resetting mechanism therefor, of pivoted cancelers 62 63, arms 88 90 connected to said cancelers respectively, lugs 82 89 carried by said register-chains and adapted to engage said arms respectively, caps 65 70, each of said caps having a series of steps, pawls 81 82 adapted to engage said steps, a lug 112 carried by said units-chain, and means for releasing said cancelers upon the operation of the resetting mechanism, substantially as described.

18. In a register, the combination with units and tens register chains, and operating mechanism and resetting mechanism therefor, of pivoted cancelers 62 63, arms 88 90 connected to said cancelers respectively, lugs 82 89 carried by said register-chains and adapted to engage said arms respectively, caps 65 70, each of said caps having a series of steps, pawls 81 82 adapted to engage said steps, a lug 112 carried by said units-chain, means for releasing said cancelers upon the operation of the resetting mechanism, and means for automatically releasing said cancelers when the limit of the capacity of the register is exceeded, substantially as described.

19. In a register, the combination with units and tens register chains, and operating mechanism and resetting mechanism therefor, of pivoted cancelers movable across the face of said register-chains, a stationary hundreds figure, one of said cancelers being adapted normally to cancel said hundreds figure, means for operating said latter canceler to expose the hundreds figure at the proper time, means for continuing the exposure of said figure during the succeeding operation of the register and means for preventing jumping of said canceler, substantially as described.

20. In a register, the combination with units and tens register chains, and a stationary hundreds figure, of cancelers adapted to cancel the indication of said register, one of said cancelers being adapted normally to cancel said hundreds figure, an arm 91 carried by said latter canceler, a lug 89 on said tens-chains, said lug being adapted to engage said arm 91 to move said latter canceler and expose the hundreds figure, and locking devices for holding said cancelers in their different positions, substantially as described.

21. In a register, the combination with units and tens register chains, and a stationary hundreds figure, of cancelers adapted to cancel the indication of said register, one of said cancelers being adapted normally to cancel said hundreds figure, an arm 91 carried by said latter canceler, a lug 89 on said tens-chains, said lug being adapted to engage said arm 91 to move said latter canceler and expose the hundreds figure, an arm 92 carried by said latter canceler, said arm being adapted to be engaged by said lug 89, locking devices for said cancelers, and means for automatically releasing said locking devices when the tens-canceler is operated by the engagement of said lug 89 with the arm 92, substantially as described.

22. In a register, the combination with units and tens register chains, and a stationary hundreds figure, of cancelers adapted to cancel the indication of said register, one of said cancelers being adapted normally to cancel said hundreds figure, an arm 91 carried by said latter canceler, a lug 89 on said tens-chain, said lug being adapted to engage said arm 91 to move said latter canceler and expose the hundreds figure, an arm 92 carried by said latter canceler, said arm being adapted to be engaged by said lug 89, pawls 81 82 adapted to lock said cancelers in their different positions, and an incline 79, said incline being adapted to strike the pawl 82 when the tens-canceler is operated by the engagement of the lug 89 with the arm 92, substantially as and for the purpose specified.

23. An operating device for registers consisting of a toggle fixedly pivoted at one end, its opposite end being movable, a guide for the latter end of said toggle, a connecting device for connecting said movable end of the toggle with the pull-bar of the register, and means for moving the members of said toggle to change their relative angular position, substantially as described.

24. An operating device for registers, consisting of bars 100 101 pivotally connected together, the opposite end of said bar 101 being pivotally mounted in a suitable support, sliding block 96, said block being pivotally connected to one end of the bar 100, a connecting device, as 93, for connecting the operating device to the pull-bar of a register, a rod 102, and a spring 104, substantially as described.

25. An operating device for registers consisting of bars 100 101 pivotally connected together, the opposite end of said bar 101 being pivotally mounted in a suitable support, sliding block 96, said block being pivotally connected to one end of the bar 100, a connecting device, as 93, for connecting the operating device to the pull-bar of a register, a rod 102, a spring 104, and a bumper 105, substantially as described.

26. An operating device for registers consisting of bars 100 101 pivotally connected together, the opposite end of said bar 101 being pivotally mounted in a suitable support, sliding block 96, said block being pivotally connected to one end of the bar 100, a connecting device, as 93, for connecting the operating device to the pull-bar of a register, a rod 102, a spring 104, and a lock for said operating device, substantially as described.

27. The combination with the operating device of a register, of a locking-pin 106 having one end adapted to engage some movable portion by the said operating device, guides 107 and 108 in which said locking-pin is supported, one of said guides provided with a slot 110, a spring 111 for moving the pin into engagement with the register-operating device, and a lug 109 on the outer portion of said locking-pin and adapted to serve with the slotted guide as a means for holding the locking-pin in an inoperative position, substantially as described.

28. In a fare-register, the combination with the trip-register, of an auxiliary indicator normally hidden from view, and means coöperating with the trip-register to automatically expose said indicator to view at the end of a predetermined movement of the trip-register, substantially as described.

29. In a fare-register, the combination with a trip-register, of an auxiliary indicator normally hidden from view, a pull-bar for operating the trip-register, and means operated by the movement of the pull-bar for automatically exposing said indicator to view when the pull-bar moves into a certain position, substantially as described.

JOHN W. MEAKER.

Witnesses:
JOHN L. JACKSON,
RALPH VAN DYKE.